UNITED STATES PATENT OFFICE.

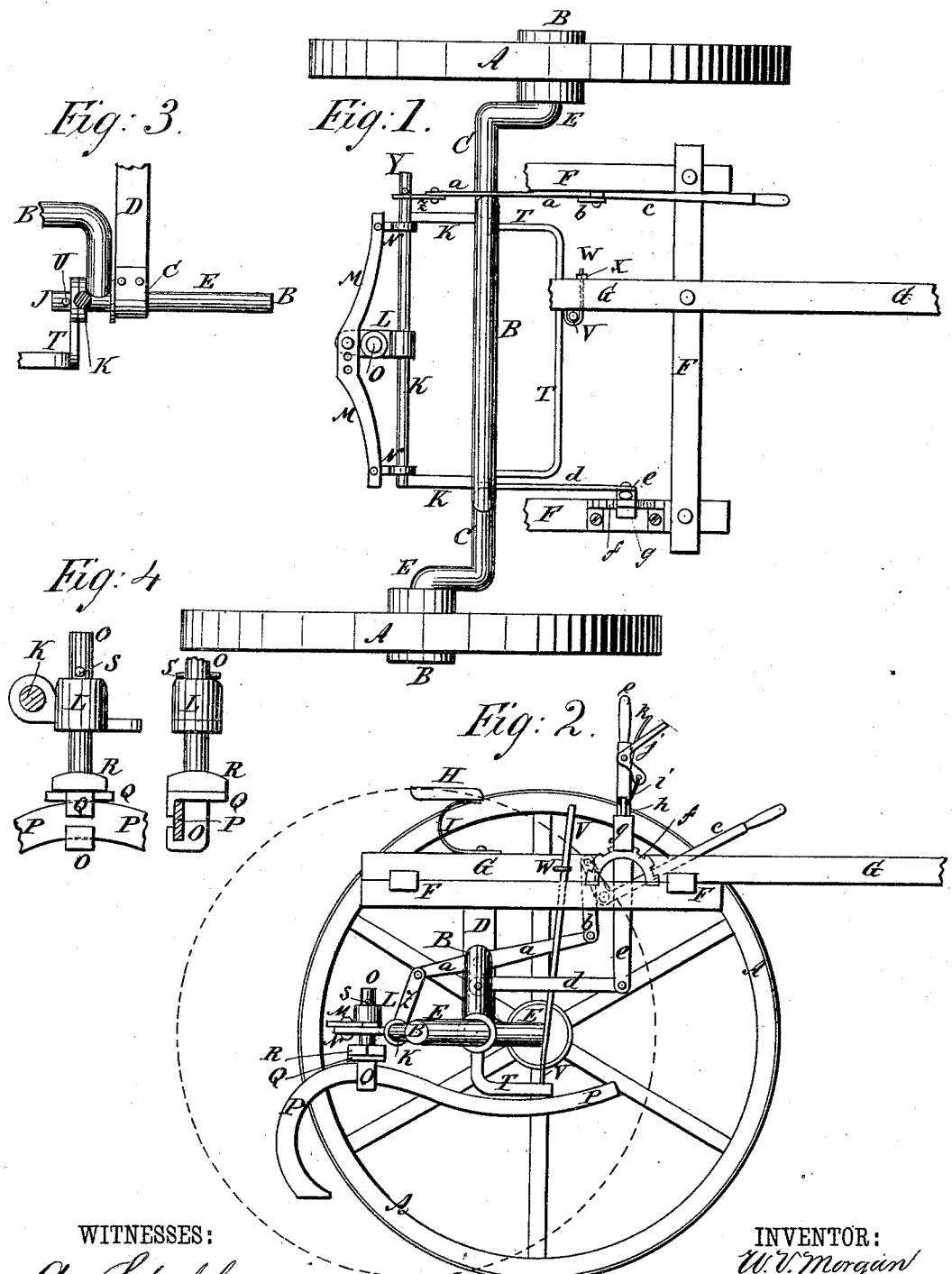

WILLIAM V. MORGAN AND THOMAS W. HACKMAN, OF ALLERTON, IOWA.

SULKY-PLOW.

SPECIFICATION forming part of Letters Patent No. 232,052, dated September 7, 1880.

Application filed February 19, 1880.

*To all whom it may concern:*

Be it known that we, WILLIAM V. MORGAN and THOMAS W. HACKMAN, of Allerton, in the county of Wayne and State of Iowa, have invented a new and useful Improvement in Sulky-Plows, of which the following is a specification.

Figure 1 is a plan view of the improvement, part being broken away. Fig. 2 is a side elevation, one of the wheels being removed. Fig. 3 represents the connection between the axle, frame, and bails. Fig. 4 represents the coupling for holding the plow-beam.

Similar letters of reference indicate corresponding parts.

The object of this invention is to furnish sulky-plows so constructed that the plows may be easily attached to and detached from the carriage, and may be readily adjusted and controlled.

A are the wheels, and B is the axle, of the carriage. The middle part of the axle B is arched, and at the ends of the arms of the arch is bent outward at right angles to form horizontal bearings C for the lower ends of the standards D. The axle B at the ends of the bearings C is bent at one side of the machine rearward and outward at right angles, and at the other side of the machine forward and outward at right angles, to form crank-axle arms E to receive the wheels A, the said crank-axle arms E thus projecting, the one rearward and the other forward, so that one of the wheels A will be raised and lowered as the other is lowered and raised.

To the upper ends of the standards D are attached the rear parts of the side bars of a rectangular frame, F, to the front and rear cross-bars of which is bolted the tongue G, so that the said tongue can be adjusted to prevent side draft and to accommodate a right-hand or a left-hand plow, as may be required.

H is the driver's seat, which is attached to the upper end of the bent spring-standard I. The lower end of the standard I is bolted to the rear part of the tongue G, so that it may be adjusted to cause the driver's weight to balance the machine, and thus prevent any downdraft from coming upon the horses' necks.

Upon the axle B, at the inner angles of the bearings C, are formed gudgeons J, projecting inward in line with the said bearings C.

K is a rectangular bail, in the ends of which are formed eyes to receive and work upon the gudgeons J. The middle part of the bail K passes through a horizontal socket in the forward part of the block L. The block L has a lug upon its rear side, to which is secured, by a bolt or rivet, the middle part of the cross-bar M. Several holes are formed in the cross-bar M to receive the bolt or rivet that secures the socket-block L to it, so that the said block may be adjusted as the desired position of the plow may require. The ends of the cross-bar M are secured by bolts or rivets to the rear ends of two short bars, N, the forward ends of which have holes formed in them, and are placed upon the middle part of the bail K, close to its angles. With this construction the socket-block L will have only a vertical play.

In the vertical socket of the block L is pivoted the shank of a hook, O, which is designed to be hooked upon the under side of the plow-beam P. Upon the shank of the hook O is placed a plate, Q, which rests upon the upper side of the beam P, and has a downwardly-projecting flange formed upon it to overlap the plow-beam, as shown in Fig. 4. The flanged plate Q is held down upon the beam P by a nut, R, screwed upon a screw-thread cut upon the lower part of the shank of the hook O to clamp the plow-beam securely to the block L. The hook O is kept from dropping out of the socket in the block L by a pin, S, passed through the upper end of the shank of the hook O above the block L.

T is a curved bail, the ends of which are bent upward, and have holes formed through them to receive the gudgeons J, upon which they are secured by pins U, passed through the ends of the said gudgeons. To the middle part of the bail T is attached the lower end of a rod, V, which passes up through the cavity of a hook-bolt, W. The hook-bolt W passes through the tongue G, and has a nut, X, screwed upon its end, so as to clamp the rod V against the side of the tongue and hold the bail T securely in any position into which it may be adjusted. The bail T rests upon the upper side of the forward part of the plow-beam P, so that the pitch of the plow may be adjusted to cause the plow to work at any desired depth in the ground.

Upon one of the angles of the bail K is formed a laterally-projecting gudgeon, Y, which passes through the end of a short connecting-bar, Z. To the other end of the bar Z is pivoted the rear end of a lever, $a$, which is pivoted to one of the standards D, and to its forward end is pivoted the lower end of a short connecting-bar, $b$, the upper end of which is pivoted to the end of the short arm of a bent lever, $c$. The lever $c$ is pivoted at its angle to a side bar of the frame F. With this construction, by operating the lever $c$ the plow can be easily raised from and lowered to the ground.

To an arm of the arched middle part of the axle B, near its angle, is pivoted the rear end of a connecting-bar, $d$, the forward end of which is pivoted to the lower end of a lever, $e$. With this construction, by operating the lever $e$ the axle B will be turned, raising one of the wheels A and lowering the other.

The lever $e$ is provided with a spring-pawl and rack-bar. By this construction the axle B will be held securely in any position into which it may be adjusted. By adjusting the axle B either wheel may be lowered to run in a furrow while the other wheel runs upon the unplowed land, so that a right-hand plow or a left-hand plow may be used, as may be desired, and both wheels may be brought to the same level, so that the machine may be horizontal when both wheels run upon the unplowed land.

Having thus described our invention, we claim as new and desire to secure by Letters Patent—

1. In a sulky-plow, the beam-clamp constructed substantially as herein shown and described, consisting of the hook-bolt O, the flanged plate Q, and the nut R, whereby the plow-beam P will be held securely, as set forth.

2. In a sulky-plow, the combination, with the bent axle B, of the bail K, the arms N, the cross-bar M, the socket-block L, and the clamp O Q R, substantially as herein shown and described, whereby the plow will be connected with the carriage adjustably, as set forth.

WILLIAM VELORIOUS MORGAN.
THOMAS WASHINGTON HACKMAN.

Witnesses:
G. M. GILLETT,
L. S. SMITH.